United States Patent [19]

Chou

[11] Patent Number: 5,647,134

[45] Date of Patent: Jul. 15, 1997

[54] COMPASS FOR MOBILE SATELLITE ANTENNAS

[76] Inventor: Shiau-fong Chou, 7th Fl., No. 14, Lane 370, Sec. 2, Shihpai Rd., Peitou Dist., Taipei, Taiwan

[21] Appl. No.: 496,890

[22] Filed: Jun. 30, 1995

[51] Int. Cl.$^6$ .......................... G01C 17/08; G01C 23/00
[52] U.S. Cl. ........................ 33/355 R; 33/333; 33/354
[58] Field of Search .................. 33/355 R, 333, 33/340, 341, 347, 349, 351, 352, 354, 364, 370, 272

[56] References Cited

U.S. PATENT DOCUMENTS

| | | | |
|---|---|---|---|
| 3,084,443 | 4/1963 | Kaatz et al. | 33/352 |
| 4,335,521 | 6/1982 | Rutherford | 33/355 R |
| 4,438,568 | 3/1984 | Kramer et al. | 33/355 R |
| 4,495,706 | 1/1985 | Kaminski | 33/333 |
| 4,920,656 | 5/1990 | Cross | 33/355 R |
| 5,060,390 | 10/1991 | Hill | 33/355 R |
| 5,187,871 | 2/1993 | McDermott | 33/333 |

FOREIGN PATENT DOCUMENTS 1218618  1/1971  United Kingdom ............... 33/355 R

*Primary Examiner*—Christopher W. Fulton
*Attorney, Agent, or Firm*—Schmeiser, Olsen & Watts

[57] ABSTRACT

A compass for mobile parabolic antenna includes a compass sphere having a transparent shell with an elevation dial and a magnetic core encapsulated by the transparent shell with fluid filled therebetween with a bubble enclosed within the transparent shell and a directional mark pointing to a fixed direction on the magnetic core, an annular plate having a location dial and a satellite name dial provided on edges of the plate, a cover plate having a central hole and a plurality of arcuated grooves, and a base plate having a circular depression, a plurality of arcuated recesses corresponding to the grooves on the cover plate defined in the depression, and a central bore corresponding to the central hole on the cover plate so that the compass sphere can be secured within the central hole and the central bore and the annular plate can be rotatably received by the circular depression when the cover plate couples with the base plate.

1 Claim, 4 Drawing Sheets

5,647,134

COMPASS FOR MOBILE SATELLITE ANTENNAS

BACKGROUND OF THE INVENTION

The present invention relates to a compass, and particularly to a compass for mobile satellite antennas.

Satellite communications are more and more popular in a modern society. However, as a microwave signal, which travels a distance of 23,000 kilometers from a satellite to the earth is weak when it reaches a parabolic antenna, the parabolic antenna has to precisely point at the satellite to achieve an optimum receiving condition for a television set. Accordingly, a user has to adjust orientations of the antenna in a trial and error process until the optimum receiving condition is achieved. Apparently, the user has to take a long time to acquire the optimum condition.

SUMMARY OF THE INVENTION

An object of the present invention is to provide a compass for satellite antenna which can be easily adjusted and achieve an optimum receiving condition for a television set.

According to the present invention, the compass includes a cover plate with a plurality of grooves and a central hole, a base plate having a circular depression, a plurality of recesses, and a central bore to be aligned with the cover plate, a compass sphere with a magnetic core encapsulated by a transparent shell and secured within the central hole of the cover plate and the central bore of the base plate for indicating an elevation of an antenna, an annular plate rotatably sandwiched by the cover plate and the base plate with a plurality of dials for adjusting an azimuth of the antenna.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
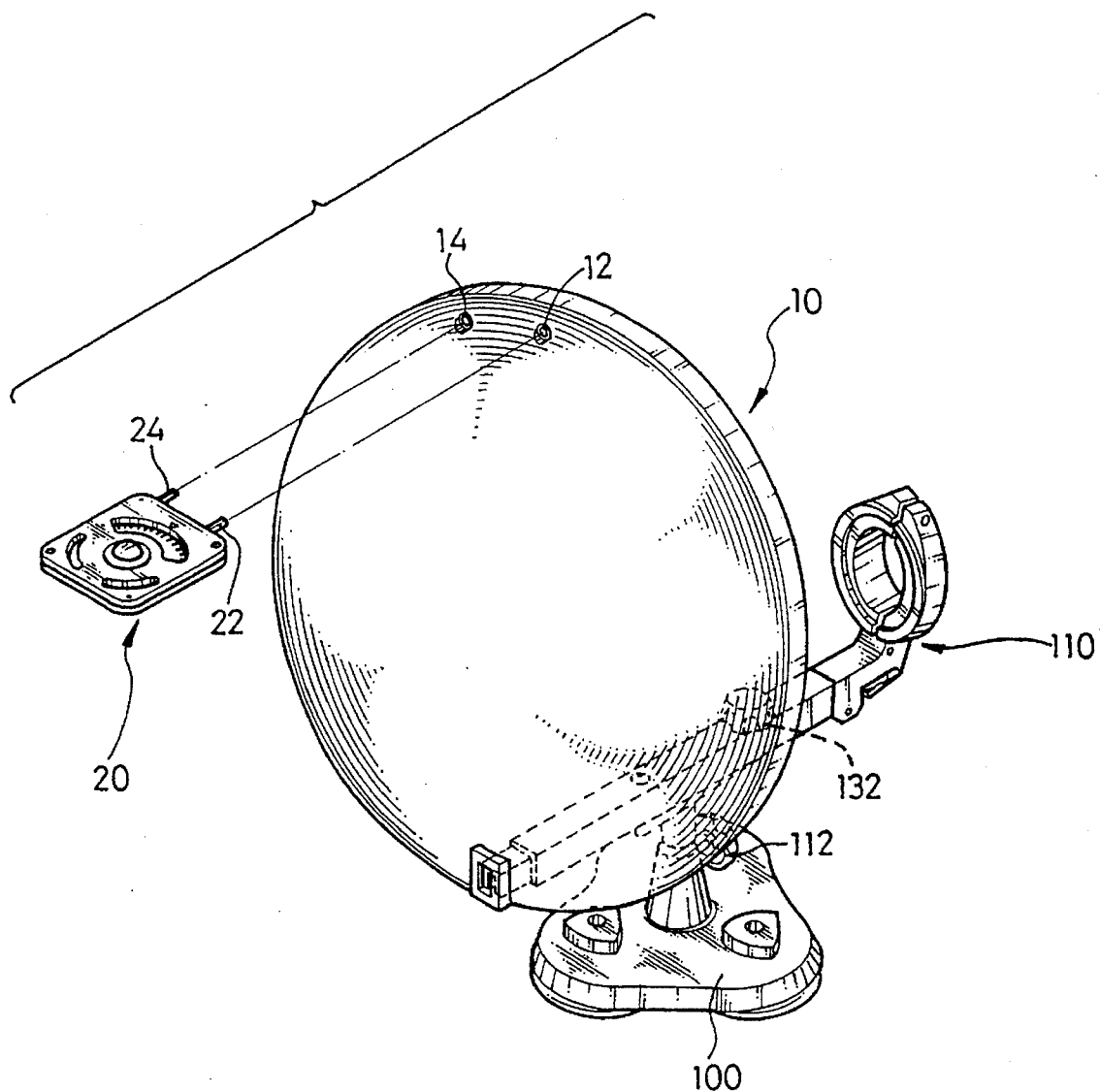
FIG. 1 is a perspective view of a parabolic antenna in combination with a compass according to the present invention.

Referring now to drawings wherein like reference characters designate identical or corresponding parts through the several views.

Referring to FIG. 1, a parabolic antenna 10 is mounted onto a pedestal 100 via a frame 110. The antenna 10 has two slots 12, 14 provided on a periphery of the antenna 10. A compass 20 has two pins 22, 24 protruding from an edge thereof to be inserted into the slots 12, 14 thereby securing the compass 20 onto the periphery of the antenna 10. The frame 110 respectively has knobs 112, 132 for tightly securing the antenna in place when a predetermined orientation is achieved.

Figure 2:
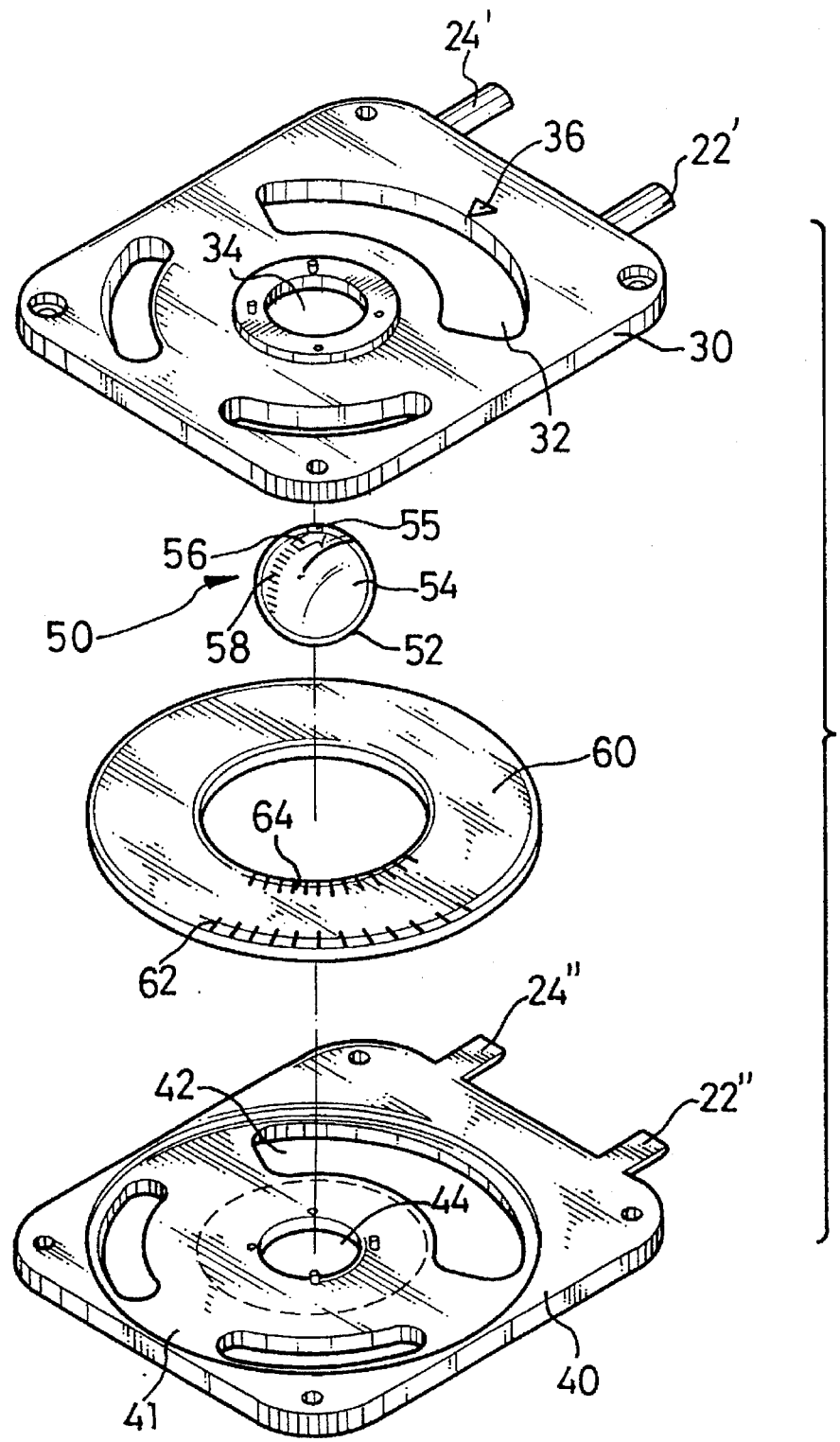
FIG. 2 is an exploded view of the compass of FIG. 1.

As shown in FIG. 2, the compass 20 includes a cover plate 30, a base plate 40, a compass sphere 50, and an annular plate 60 sandwiched by the cover plate 30 and the base plate 40. The cover plate 30 has a plurality of arcuated openings 32 and a central hole 34 defined therethrough. An orientating mark 36 pointing to one of the grooves 32 is provided on the cover plate 30. The base plate 40 has a circular depression 41 for receiving the annular plate 60 when the annular plate 60 is sandwiched by the cover plate 30 and the base plate 40.

A plurality of recesses 42 are provided on the base plate 40 corresponding to the openings 32 on the cover plate 30 for a user to rotate the annular plate 60 when the cover plate 30 is coupled with the base plate 40. A central bore 44 corresponding to the central hole 34 on the cover plate 30 is defined in the base plate 40 for mounting the compass sphere 50 in place when the cover plate 30 couples with the base plate 40. The cover plate 30 and the base plate 40 each respectively have semicircular rods 22', 24' and 22", 24" thereby forming the pins 22, 24 to be inserted into the slots 12, 14 when the cover plate 30 couples with the base plate 40.

The compass sphere 50 includes a transparent shell 52 and a magnetic core 54 encapsulated by the transparent shell 52 with fluid filled therebetween with a bubble 55 enclosed within the transparent shell 52. The magnetic core 54 has a directional mark 56 pointing to a direction of south. An elevation dial 58 is provided on a surface of the shell 52 for showing an elevation of the parabolic antenna 10.

The annular plate 60 has a location dial 62 and a satellite name dial 64 respectively provided on an outer edge and an inner edge of the plate 60 for indicating a city where the antenna is located and a name of the related satellite.

Figure 3:
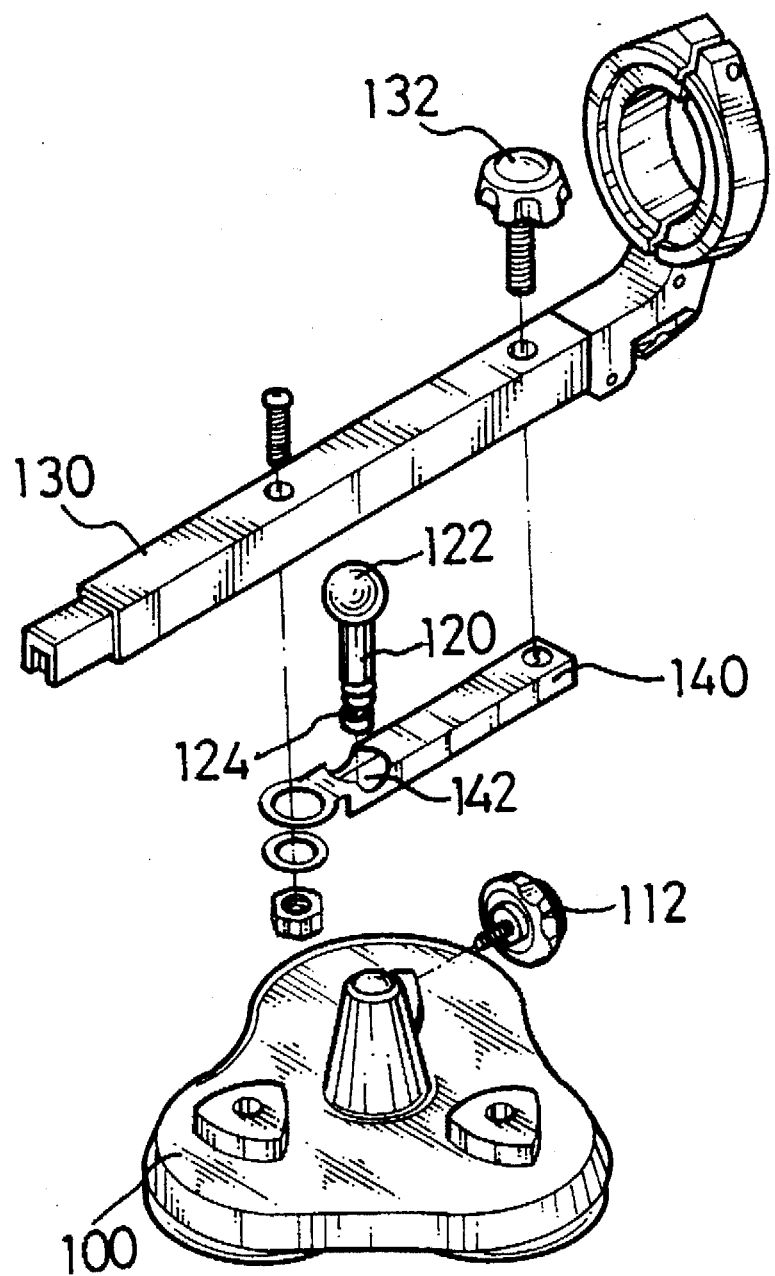
FIG. 3 is an exploded view of a frame according to the present invention.

Referring to FIG. 3, the frame 110 includes a shaft 120 for coupling with the pedestal 100 and a U-cross-sectional bar 130 connected between the shaft 120 and the antenna (not shown). The shaft 120 has a ball head 122 in a first end for adjusting the azimuth of the bar 130 and a circumferential groove 124 on a second end for securing the shaft 120 in place by turning the knob 112 and having a screw on the knob 112 to extend to the circumferential groove 124. A plate 140 has a cavity 142 for receiving the ball head 122 of the shaft 120 and securing the shaft 120 onto the bar 130 by coupling the plate 140 onto the bar 130. When a desired elevation is achieved the plate 140 is tightly secured onto the bar 130 by turning the knob 132.

Figure 4:
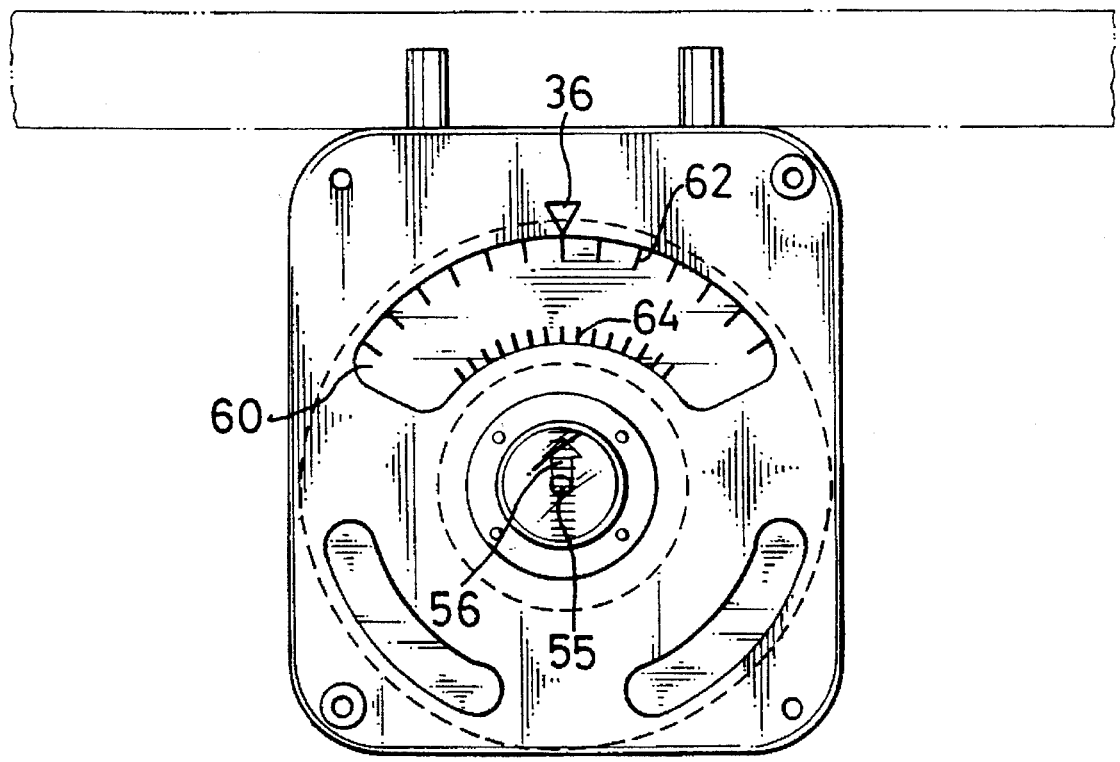
FIG. 4 is a plan view of the compass of the present invention.

A plan view of the compass of the present invention is shown in FIG. 4. The following are the steps of adjusting the orientation of the antenna: 1) rotate the annular plate 60 to have the orientating mark 36 point to a name of the location dial 62 where the antenna is located; 2) loosen the knob 112 (in FIG. 1) thereby allowing the antenna to make a horizontal movement; 3) move the frame 110 to have the directional mark 56 to point to a name on the satellite name dial 64; 4) tighten the knob 112; 5) look up a specification of the antenna and acquire elevation data of the related satellite; 6) loosen the knob 132 (in FIG. 1) and have the bubble 55 overlap with a value of the elevation dial 58 acquired from the specification; and 7) tighten the knob 132.

Although the invention has been explained in relation to its preferred embodiment, it is to be understood that many other possible modifications and variations can be made without departing from the spirit and scope of the invention as hereinafter claimed.

I claim:

1. A compass for a mobile parabolic antenna comprising:
    a compass sphere having a transparent shell with an elevation dial and a magnetic core encapsulated by the transparent shell with fluid filled therebetween with a bubble enclosed within the transparent shell and a directional mark pointing to a fixed direction on the magnetic core;

an annular plate having a location dial and a satellite name dial provided on edges of the plate;

a cover plate having a central hole and a plurality of arcuated openings; and a base plate having a circular depression, a plurality of arcuated recesses corresponding to the openings on the cover plate defined in the depression, and a central bore corresponding to the central hole on the cover plate so that the compass sphere can be secured within the central hole and the central bore and the annular plate can be rotatably received by the circular depression when the cover plate couples with the base plate.

* * * * *